Patented July 22, 1924.

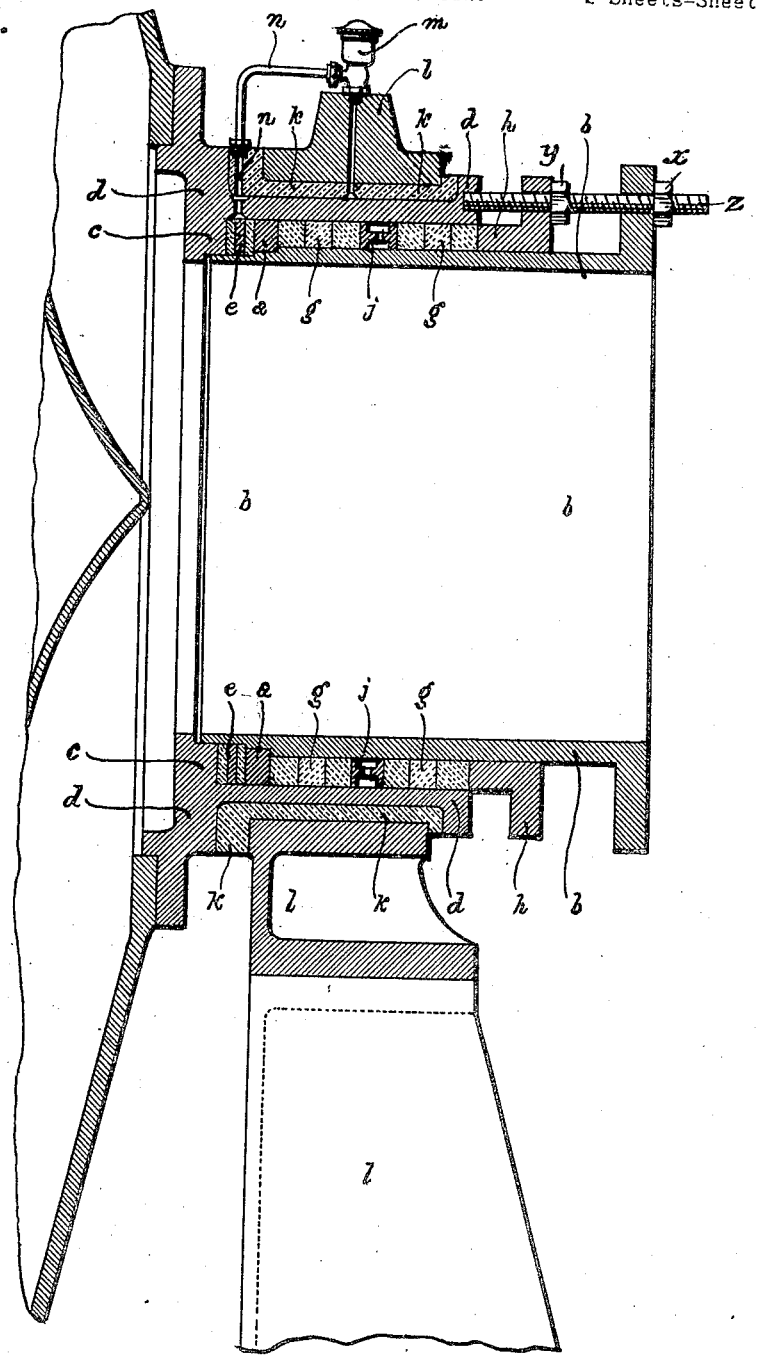

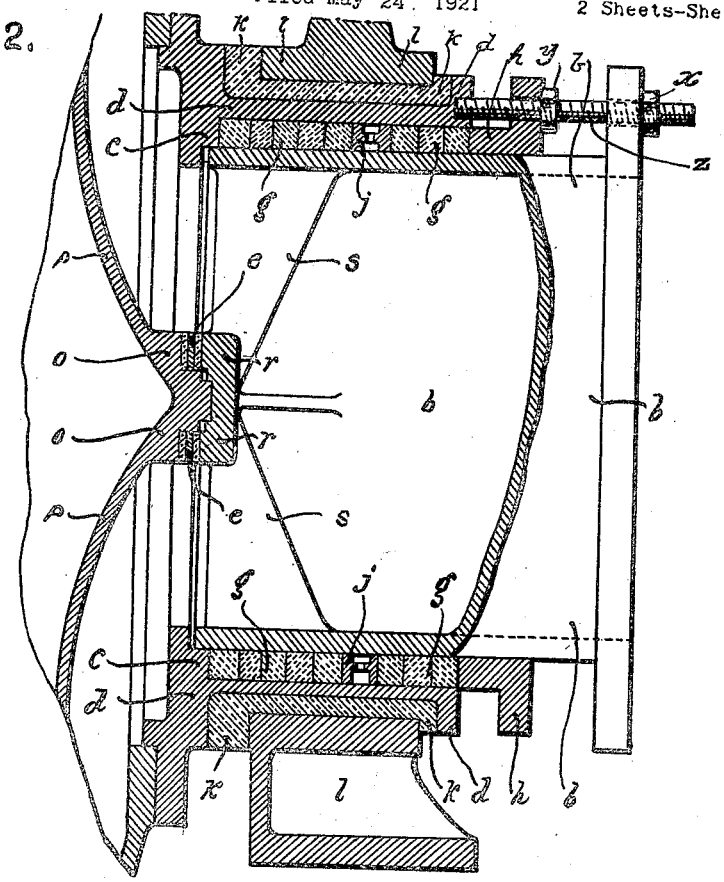
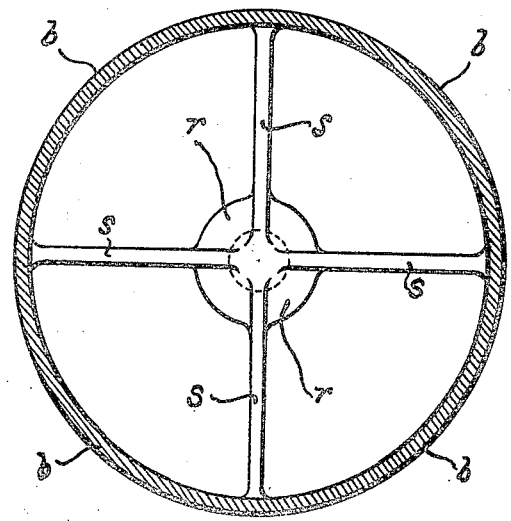

1,502,525

UNITED STATES PATENT OFFICE.

DAVID McNAB RAMSAY, OF GLASGOW, SCOTLAND.

STEAM CONDENSER.

Application filed May 24, 1921. Serial No. 472,133.

*To all whom it may concern:*

Be it known that I, DAVID McNAB RAMSAY, a subject of the King of Great Britain and Ireland, and a resident of Glasgow, Scotland, engineer, have invented certain new and useful Improvements in Connection with Steam Condensers, of which the following is the specification.

In steam condensers of the kind described in the specification of my prior Patent No. 1,209,331, dated 19th December, 1916, a certain amount of end thrust due to the unbalanced area of the trunnion steam-admission pipe has to be provided for.

In the particular example described with reference to the drawings annexed to that specification, this end thrust is taken at the central discharge manifold, thus imposing a longitudinal tensional stress upon the drum-like structure. In condensers of relatively small size, such a stress is of little moment but where the structure is large, it is best that it should be avoided.

The invention has for its object to provide simple and effective means for the removal of this end thrust from the drum like structure.

According to the invention there is provided between the trunnion steam-admission pipe and the tubular header-carrying member in addition to a gland to prevent air-leakage, a thrust bearing of any convenient kind. This bearing may very conveniently be arranged between an inward shoulder on a sleeve on the member at the inner end of the trunnion pipe and a collar on that pipe, and may consist of a gland-like arrangement of metallic or like packing or may consist of a series of metallic thrust washers or a metallic thrust bearing of other type, means being of course provided for its lubrication. Outside the collar there is preferably provided a gland packing (preferably water-sealed) adapted to prevent the induction of air. The sleeve is rotatably supported as heretofore in a pedestal bearing.

Alternatively, or in addition, a thrust bearing may be arranged between a central boss carried on an internal spider in the trunnion pipe and a like boss formed on the central steam-directing portion of the header member.

Two examples of the carrying out of the invention are shown on two accompanying sheets of explanatory drawings, Figure 1, Sheet 1, being a sectional side elevation of one example and Figures 2 and 3, Sheet 2, respectively, a sectional side and a sectional end elevation of the other.

In the example shown in Figure 1 there is arranged between a collar $a$ fast on the trunnion steam admission pipe $b$ and an inwardly extending shoulder $c$ on a sleeve $d$ on the rotatory header-carrying member $a$ thrust bearing $e$ consisting of a series of discs. Outside the collar $a$ is a series of metallic or other usual stuffing-box packing rings $g$ compressed by a usual gland $h$. Both the trunnion pipe $b$ and gland $h$ are drawn toward the sleeve $d$ by nuts $x$ and $y$ respectively on the screw stud $z$ secured to the outer end of the sleeve $d$. Intermediately, in the series of rings $g$ is a lantern gland or spacing ring $j$ communicating at its periphery with a water-supply arrangement of usual type (not shown) for the purpose of sealing the whole packing device against the induction of air. The sleeve $d$ is supported in a bearing brass $k$ carried in a pedestal $l$ and oil is supplied to the thrust rings $e$ and to the packing rings $g$ from a container $m$ by a pipe and passages and ports $n$ in the brass $k$ and pedestal cap $l$.

The example shown in Figures 2 and 3 differs from that described in that gland packing rings $g$ are arranged throughout the space between the steam-admission pipe $b$ and the sleeve $d$ and the thrust bearing again consisting of a series of discs $e$ is arranged between a central boss $o$ formed on the central steam-directing portion of the drum header $p$ and a like boss $r$ on a spider $s$ formed on the inner end of the steam-admission pipe $b$. Oil may be led to this bearing in any convenient manner. It is clear that functionally the bosses $o$ and $r$ of this construction correspond to the shoulder $c$ and collar $a$ of the construction first described. In the appended claim therefore the expressions "collar" and "shoulder" are used in a sense broad enough to embrace the co-acting abutments of the thrust bearings of both types.

What I claim is:—

In a steam condenser, a stationary trunnion-like steam admission pipe, a rotatory header-carrying member having a sleeve surrounding said pipe, a collar at the inner end of the steam admission pipe, a co-acting shoulder on the header-carrying member, a thrust bearing between said collar and shoulder at one side of the plane of the collar, and a gland packing between the pipe and sleeve on the opposite side of the plane of the collar on the steam admission pipe.

In testimony whereof I have signed my name to this specification.

DAVID McNAB RAMSAY.